US008750241B2

(12) United States Patent
Mahesh et al.

(10) Patent No.: US 8,750,241 B2
(45) Date of Patent: Jun. 10, 2014

(54) CONCURRENT ASSOCIATION WITH MULTIPLE WIRELESS NETWORKS

(75) Inventors: Kumar Mahesh, San Ramon, CA (US); Jeffrey M. GIlbert, Palo Alto, CA (US); James Gilb, San Diego, CA (US)

(73) Assignee: SiBeam, Inc., Sunnyvale, CA (US)

( * ) Notice: Subject to any disclaimer, the term of this patent is extended or adjusted under 35 U.S.C. 154(b) by 796 days.

(21) Appl. No.: 11/999,810

(22) Filed: Dec. 7, 2007

(65) Prior Publication Data

US 2008/0137555 A1 Jun. 12, 2008

Related U.S. Application Data

(60) Provisional application No. 60/873,645, filed on Dec. 8, 2006.

(51) Int. Cl.
*H04W 4/00* (2009.01)
(52) U.S. Cl.
USPC ............................ 370/331; 370/310; 370/350
(58) Field of Classification Search
USPC .................................................. 370/331, 334
See application file for complete search history.

(56) References Cited

U.S. PATENT DOCUMENTS

| 6,026,297 | A  | * | 2/2000 | Haartsen ..................... 455/426.1 |
| 6,546,425 | B1 | * | 4/2003 | Hanson et al. ................. 709/227 |
| 7,630,333 | B2 | * | 12/2009 | Bichot ........................... 370/328 |
| 2004/0165563 | A1 | * | 8/2004 | Hsu et al. ..................... 370/338 |
| 2004/0185876 | A1 | * | 9/2004 | Groenendaal et al. ..... 455/456.5 |
| 2004/0218580 | A1 | * | 11/2004 | Bahl et al. ..................... 370/350 |
| 2005/0198337 | A1 | * | 9/2005 | Sun et al. ..................... 709/230 |
| 2005/0232206 | A1 | * | 10/2005 | Chau et al. .................... 370/338 |
| 2006/0067526 | A1 | * | 3/2006 | Faccin et al. ..................... 380/46 |
| 2006/0104245 | A1 | * | 5/2006 | Narayanaswami et al. ... 370/332 |
| 2006/0126582 | A1 | * | 6/2006 | Saifullah et al. ............... 370/338 |
| 2006/0292986 | A1 | * | 12/2006 | Bitran et al. .................. 455/41.2 |
| 2007/0109990 | A1 | * | 5/2007 | Bennett ......................... 370/328 |
| 2007/0165593 | A1 | * | 7/2007 | Hundal et al. ................. 370/349 |
| 2007/0268868 | A1 | * | 11/2007 | Singh et al. ................... 370/331 |
| 2007/0286222 | A1 | * | 12/2007 | Balasubramanian ......... 370/412 |
| 2008/0056133 | A1 | * | 3/2008 | Deshpande et al. .......... 370/235 |

FOREIGN PATENT DOCUMENTS

WO WO 03/094017 A 11/2003
WO WO 2006/061692 A2 6/2006

OTHER PUBLICATIONS

Caetano, L., "60 GHz Architecture for Wireless Video Display", Mar. 2006, pp. 1-6.
Wireless HD, "WirelessHD Specification Version 1.0 Overview", URL:http://www.wirelesshd.org/WirelessHD_Full_Overview_071009.pdf, Oct. 9, 2007, 77 pgs.

(Continued)

*Primary Examiner* — Brandon Renner
*Assistant Examiner* — Scott M Sciacca
(74) *Attorney, Agent, or Firm* — Fenwick & West LLP

(57) ABSTRACT

A wireless station has a media access controller (MAC) and a concurrent association manager. The concurrent association manager concurrently associates the wireless station with two or more wireless coordinators. Each wireless coordinator forms its respective wireless network. The concurrent association manager sets the wireless station in a sleep mode operation with respect each wireless network and detects a selection for operation with respect to one of the wireless coordinator.

18 Claims, 6 Drawing Sheets

(56) References Cited

OTHER PUBLICATIONS

PCT International Search Report for corresponding PCT Patent Application No. PCT/US2007/025269, Jun. 11, 2008, 6 Pgs.

PCT Written Opinion of the International Searching Authority for corresponding PCT Patent Application No. PCT/US2007/025269, Jun. 11, 2008, 9 Pgs.

International Preliminary Report on Patentability for PCT Patent Application No. PCT/US2004/025269, dated Jun. 18, 2009, 9 pages.

* cited by examiner

CONCURRENT ASSOCIATION WITH MULTIPLE WIRELESS NETWORKS

RELATED APPLICATIONS

This application claims the benefit of U.S. Provisional Application No. 60/873,645 filed Dec. 8, 2006.

FIELD OF THE INVENTION

The present invention relates to the field of wireless communication; more particularly, the present invention relates to a wireless communication device.

BACKGROUND OF THE INVENTION

On power up, a wireless station can detect multiple coordinators. However, the wireless station has to choose among the multiple coordinators without prior knowledge whether it needs to be associated with any specific coordinator. As such, a station can incorrectly choose a coordinator.

A need therefore exists for a wireless station to be concurrently associated with multiple coordinators until selected for operation by a device in a specific network.

SUMMARY OF THE INVENTION

A wireless station has a media access controller (MAC) and a concurrent association manager. The concurrent association manager concurrently associates the wireless station with two or more wireless coordinators. Each wireless coordinator forms its respective wireless network. The concurrent association manager sets the wireless station in a sleep mode operation with respect each wireless network and detects a selection for operation with respect to one of the wireless coordinator.

DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

An apparatus and method for concurrent association with multiple wireless networks is disclosed. In one embodiment, a wireless station has a media access controller (MAC) and a concurrent association manager. The MAC generates a packet to carry audio, video, and/or data traffic. The concurrent association manager concurrently associates the wireless station with two or more wireless coordinators. Each wireless coordinator forms its respective wireless video area network. The concurrent association manager sets the wireless station in a sleep mode operation with respect to each wireless network and detects a selection for operation with respect to one of the wireless coordinator. In one embodiment, each wireless network operates in a frequency band of 60 GHz. In one embodiment, each wireless network includes beam-forming wireless networks. in one embodiment, a storage is configured to cache multiple beam vectors.

Figure 1:
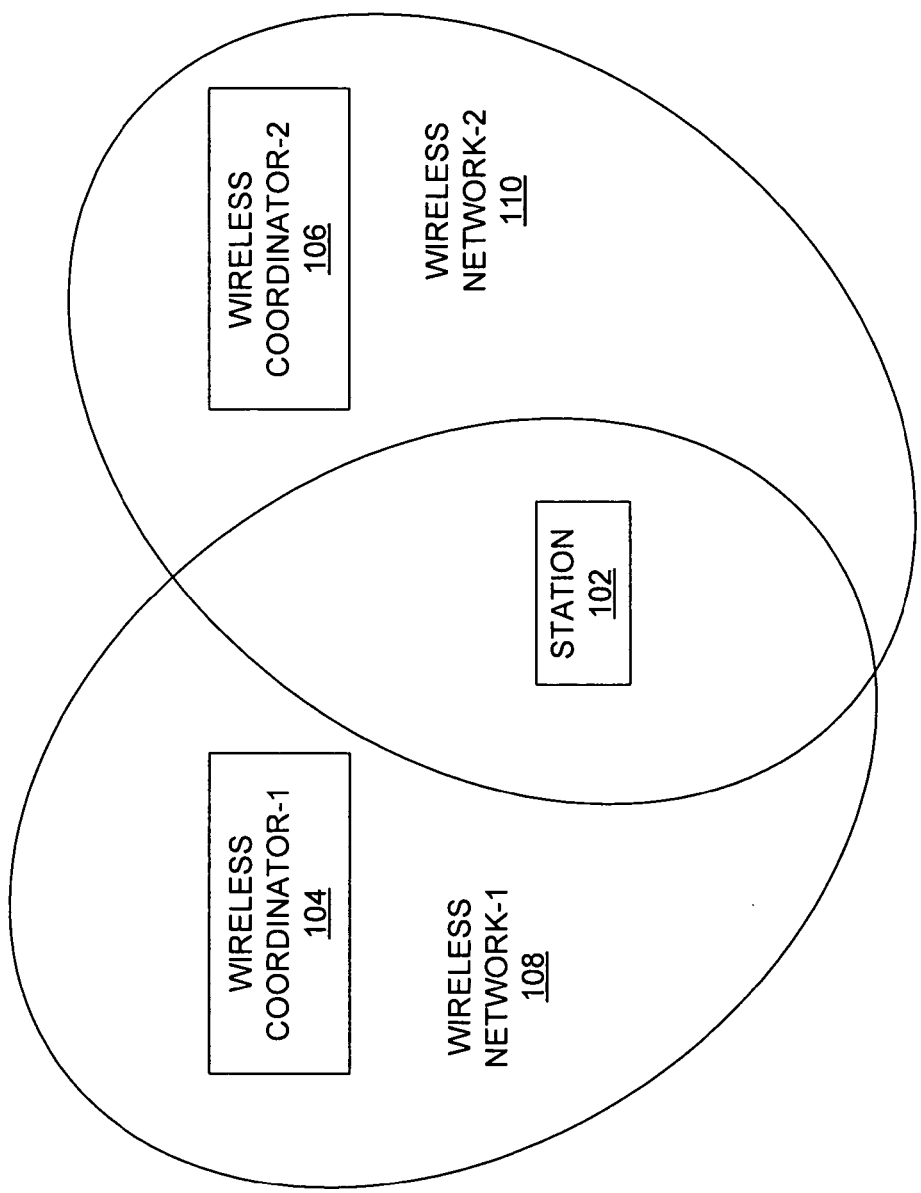
FIG. 1 is a block diagram of one embodiment of a station in concurrent association with two coordinators.

FIG. 1 is a block diagram of one embodiment of a station 102 in concurrent association with two coordinators 104, 106. In one embodiment, the station may include a wireless high-definition station configured to transmit wireless audio and video data to coordinators 104, 106 within range. For example, station 102 may be a DVD player or a camcorder. In one embodiment, coordinators 104, 106 may include devices that control admission to a wireless network, for example, a TV, a base station, or an access point. Each coordinator may instantiate its own wireless network. For example, the wireless network can include a wireless video area network (WVAN), a wireless local area network (WLAN), among other types of networks. With respect to FIG. 1, coordinator 104 has instantiated Wireless Network-1 108, and coordinator 106 has instantiated Wireless Network-2 110. Station 102 is within range of both coordinators 104, 106. Station 102 may be concurrently associated with multiple coordinators 104, 106 until station 102 is specifically chosen for active operation within a specific wireless network (Wireless Network-1 108 or Wireless Network-2 110).

Figure 2:
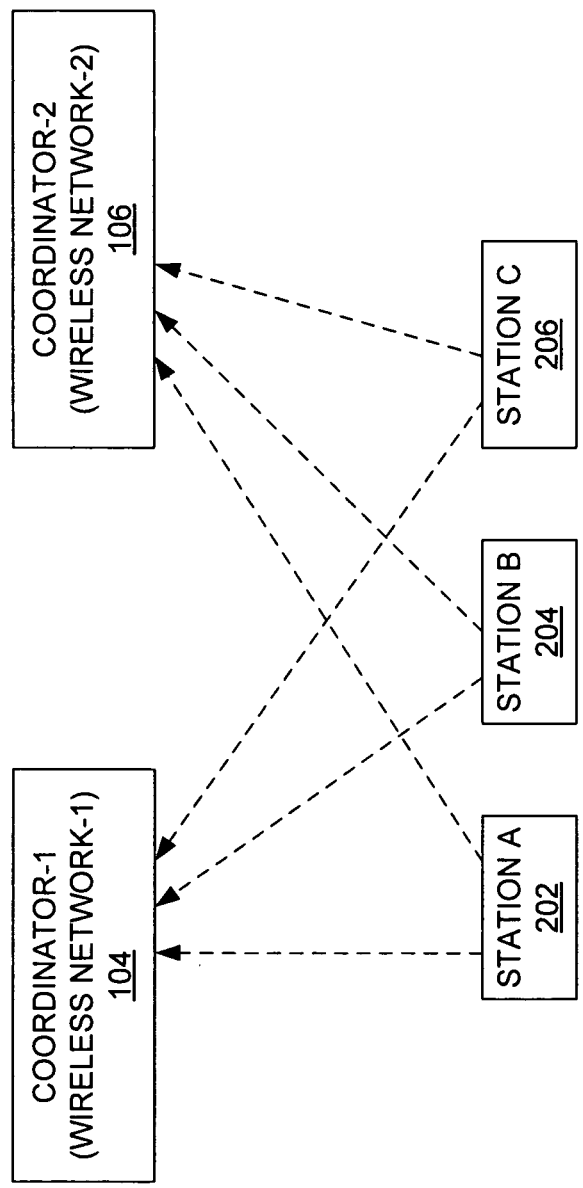
FIG. 2 is a block diagram of one embodiment of several stations in concurrent association without streams.

FIG. 2 is a block diagram of an example of several stations in concurrent association. Station A 202, station B 204, and station C 206 are concurrently associated with both coordinators 104, and 106. In one embodiment, each station operates in a sleep mode with respect to each coordinator 104, 106.

In some wireless protocols, e.g., 802.11 and WirelessHD™ (specified by SiBeam Inc.), devices in the wireless network go to sleep without any pre-arranged time to wake up, which can be referred to as an asynchronous sleep mode. On the other hand, in other protocols, e.g., 802.15.3, when a device goes to sleep, it has a pre-arranged time when it will wake up. The time when the device will wake up is communicated to other devices in the wireless network so that they will know when they can communicate with the sleeping device. This type of sleep mode can be referred to as a synchronized sleep mode.

Synchronized sleep modes not only enable efficient use of power, but also can be used to allow the sleeping device to maintain a low-rate data connection while in sleep mode. For example, if a device supports 100 Mb/s data rate but has an application that only requires 1 Mb/s, it can sleep for 99 ms, wake up for 1 ms, send data at 100 Mb/s and return to sleep mode. The average delivered data rate is 1 Mb/s, but the device spends 99% of its time in sleep mode.

With respect to FIG. 2, if station A 202 wants to maintain association with multiple wireless networks, e.g., Wireless Network-1 and Wireless Network-2 that support synchronized sleep modes, it can arrange its sleep modes so that its wake times do not overlap. In this manner, when another coordinator, for example coordinator-2 106, in Wireless Network-2 wants to communicate with station A 202, coordinator-2 106 waits until station A 202's scheduled wake up time in Wireless Network-2 to begin communications. If the messaging is short, station A 202 can return to sleep mode quickly, expending little energy. Using concurrent association, station A 202 can maintain communication with devices in multiple wireless networks while spending most of its time in sleep mode, saving power. Many higher level protocols require periodic communications so the ability to maintain communications with multiple wireless networks can be a great advantage. In this case, station A 202 can appear to be an active member in all of the wireless networks for which it is maintaining association.

If station A 202 has the bandwidth to source or sink multiple data or A/V streams, it would be able to maintain multiple connections in one or more wireless networks with which it is maintaining association. As an example, suppose in one wireless network, station A 202 is acting as an audio source while in another wireless network it is recording audio. Further suppose that Station A 202 maintains concurrent association with both networks, waking up periodically to source or sink the audio at a high rate, maintaining an average data rate that is sufficient for the application. Suppose that station A 202 can communicate at 100 Mb/s and it needs to source and sink streams, each at 10 Mb/s, in networks that have 10 ms superframes. Station A 202 would schedule communications for 5 ms every 5 superframes (50 ms) in each of the networks. It would need to buffer 45 ms of data at 10 Mb/s for each stream, or about 56 kBytes for each of the streams. Multiple video streams or high rate data connections could also be supported if the device had sufficient bandwidth, i.e., multiple gigabits/s.

Figure 3:
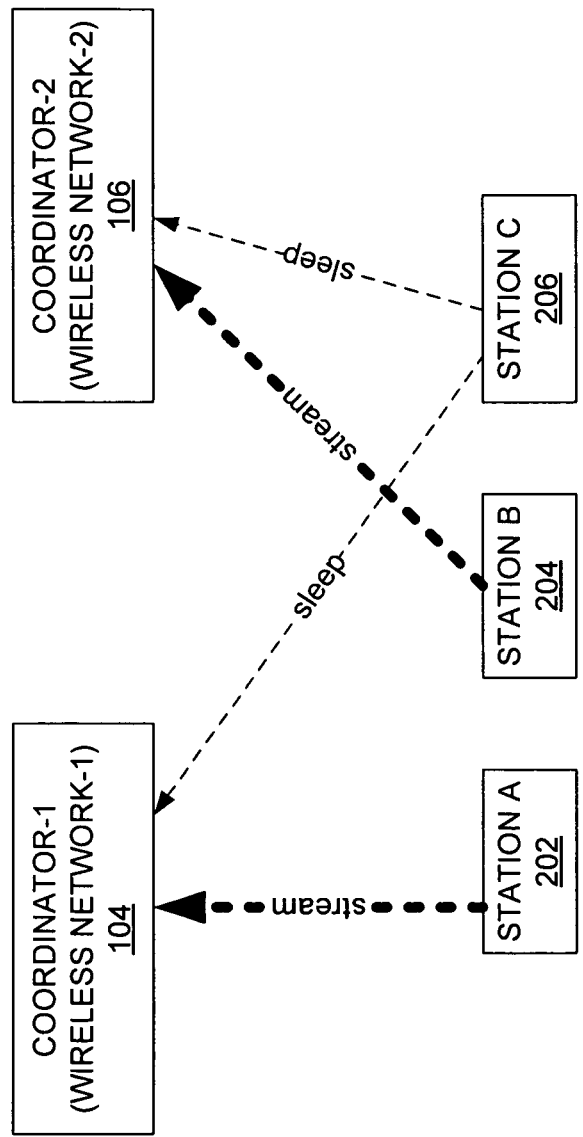
FIG. 3 is a block diagram of one embodiment of several stations in concurrent association with streams.

FIG. 3 is a block diagram of an example of several stations in concurrent association with audio and video streams. In this example, station A 202 is associated only with coordinator-1 104 since it operates, for example an A/V (Audio/Video) stream, in Wireless Network-1. Station B 204 is associated only with coordinator-2 106 since it operates a stream in Wireless Network-2. Station C 206 is concurrently associated with both coordinators 102 and 104 since station C 206 does not operate any stream with either coordinator 104, 106. As such, station C 206 operates in a sleep mode with respect to coordinators 104 and 106.

Figure 4A:
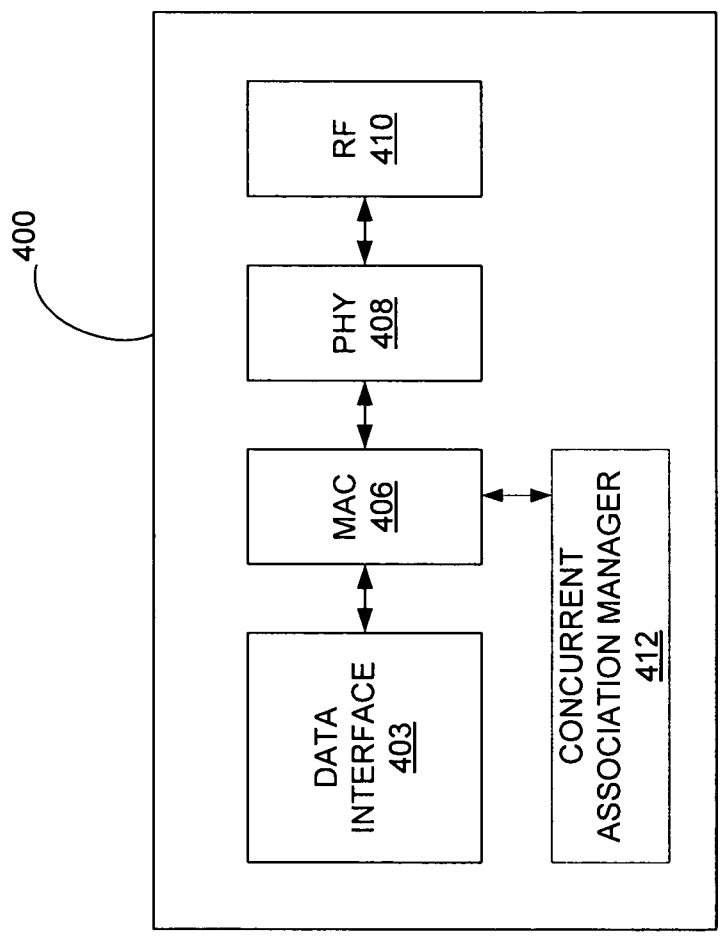
FIG. 4A is a block diagram of one embodiment of a station.

FIG. 4A is a block diagram of one embodiment of a station. The station 400 may include a data interface 403, a media access controller (MAC) 406, a physical device interface (PHY) 408, a radio module 410, and a concurrent association manager 412. Data Interface 403 402 is configured to receive data from various types of sources. For example, data interface 403 may receive data from storage disks (DVDs) or other types of media. MAC 406 handles generating and parsing physical frames. PHY 408 handles how this data is actually moved to/from the radio module 410.

Concurrent association manager 412 may be coupled to MAC 406 to associate station 400 with multiple coordinators until specifically chosen for active operation within a specific wireless networks. The operations of concurrent association manager are described in more detail with respect to FIG. 5.

Figure 4B:
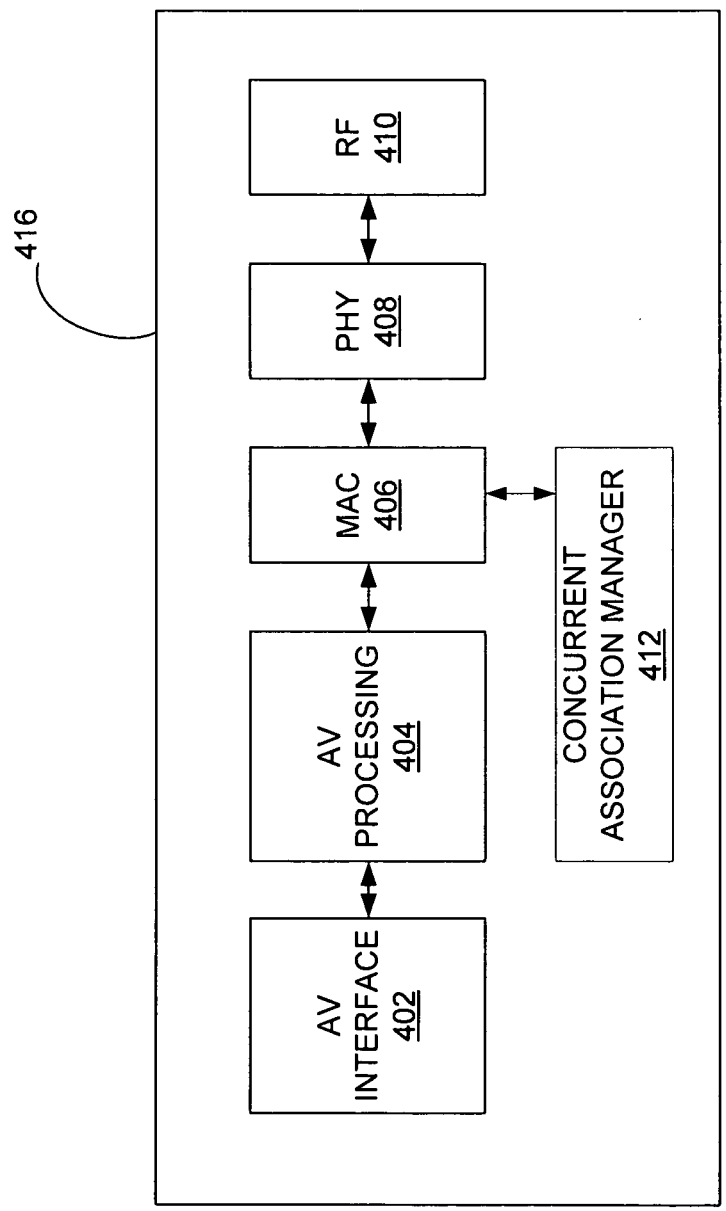
FIG. 4B is a block diagram of another embodiment of a station.

FIG. 4B is a block diagram of another embodiment of a station 416. The station 416 includes an Audio/Video interface 402, an Audio/Video (AV) processor 404, a media access controller (MAC) 406, a physical device interface (PHY) 408, a radio module 410, and a concurrent association manager 412. The AV interface 402 may be configured to interface with various data storage medium (e.g., disks, memory cards, etc . . . ). AV processor 404 receives and processes data from AV interface 402. MAC 406 handles generating and parsing physical frames. PHY 408 handles how this data is actually moved to/from the radio module 410. As an example, a wireless specification could support two basic types of PHY: high rate PHY (HRP) and low rate PHY (LRP). Concurrent association manager 412 operates in the same manner as in FIG. 4A.

Figure 5:
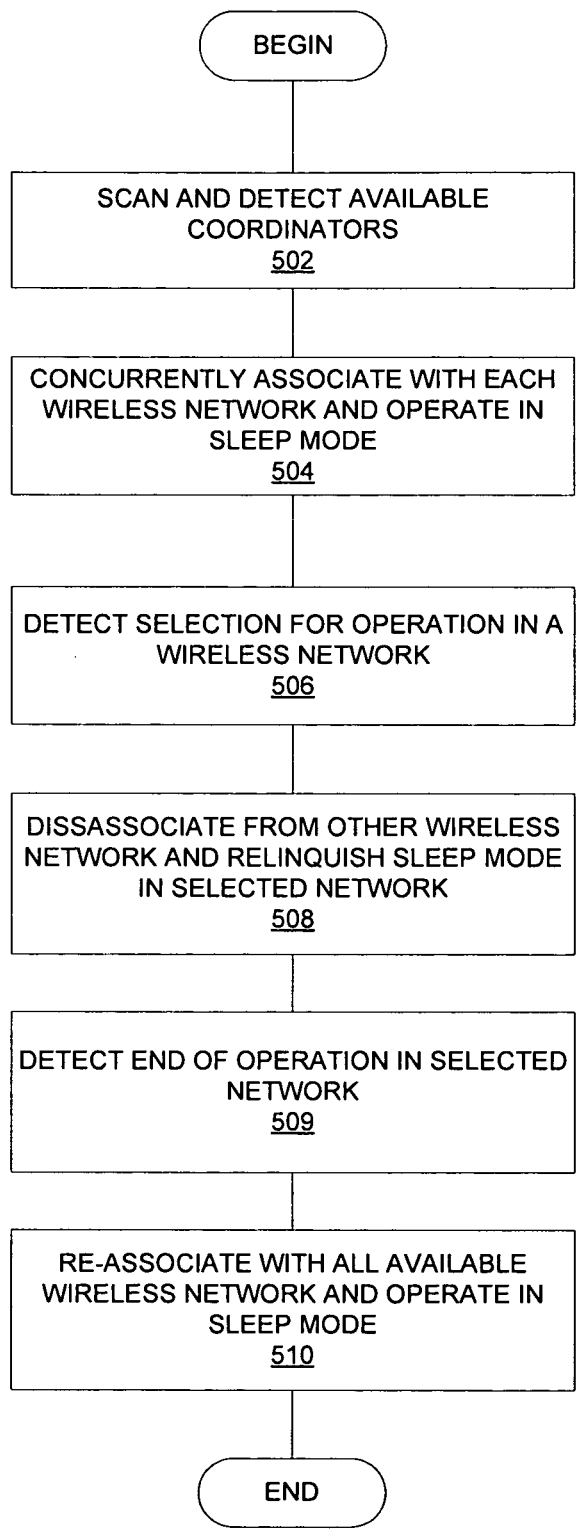
FIG. 5 is a flow diagram of one embodiment of a method for concurrent association with multiple wireless networks.

FIG. 5 is a flow diagram of one embodiment of a method for concurrent association with multiple wireless networks. At 502, on power-up, a station scans and detects available coordinators within range of wireless coordinators. Each wireless coordinator forms its own wireless network. Those of ordinary skills in the art will recognize that there are many types of wireless networks such as WVAN or WLAN among others. At 504, the wireless station is concurrently associated with each wireless coordinator and operates in a sleep mode with respect to each wireless network. Within every association timeout period, the wireless station renews its association with each of the wireless coordinators.

In one embodiment, the wireless station may include a wireless high definition (HD) station for sending high-definition audio, video, and data streams. In another embodiment, the station may conform to wirelessHD™ specification as offered by SiBeam Inc. When the wireless HD station is in sleep mode, it periodically wakes up to listen to each of the coordinators to which it is associated with. While the wireless HD station is in sleep mode, the coordinator queues up all data and control packets destined for the wireless HD station and inform the wireless HD station to wake-up at the next available opportunity. On a periodic wake-up, the wireless HD station checks the coordinator transmissions to see if it needs to stay awake in the wireless network to process data and control packets. When data and control packets are pending at the coordinator, the wireless HD station stays in wake-up state, processes the packets, and goes back to the sleep mode.

At 506, the wireless station detects a selection for operation with respect to one of the wireless coordinator. Those of ordinary skills in the art will recognize that there are many ways of detecting if a station is selected for operation in a WLAN, such a connection request from another station, connection indication from the present station, user input at the station, etc . . .

At 508, if the wireless station is selected for operation in one of the wireless network, it dissociates itself from all other wireless networks and relinquishes the sleep mode operation in the previously selected wireless network. At 509, the wireless station detects the completion of the operation (for example, an AV operation) in the selected wireless network. At 510, when the wireless station completes the operation in the selected wireless network, it re-associates with all available wireless coordinators at that time, and puts itself into sleep mode with respect to each wireless network.

In the description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A station comprising:
   a media access controller (MAC); and
   a concurrent association manager coupled to the MAC, the concurrent association manager comprising a processor and a non-transitory computer-readable storage medium storing instructions to concurrently associate the station with a first set of plural coordinators, with each coordinator in the first set forming its respective wireless network,
   wherein the instructions of the concurrent association manager when executed by the processor are operable to:
   set the station in a sleep mode operation with respect to each wireless network, coordinate synchronized sleep modes between the terminal and each of the first set of plural coordinators so that wake times of the station with respect to each of the coordinators do not completely overlap and each of the coordinators is operable to transmit a connection request to the station based on the wake times,
   during the sleep mode operation, detect that the station has been selected, as indicated by a connection request, connection indication or user input, for an active operation with respect to one of the coordinators in the first set,
   upon detection that the station has been selected for the active operation, dissociate the station with all other coordinators in the first set and relinquish the sleep mode operation with respect to the one of the coordinators in the first set to thereby perform the active operation, and
   upon completion of the active operation, re-associate the station with a second set of plural coordinators and operate the station in the sleep mode operation with respect to wireless network formed by the second set of plural coordinators, wherein the first set of plural coordinators are available to the station before the active operation and the second set of plural coordinators are available to the station after the active operation at the time of re-association.

2. The station of claim 1 wherein the MAC is configured to generate a packet to carry audio, video, and data traffic.

3. The station of claim 1 wherein the station includes a wireless high definition station, and the first set of plural coordinators and the second set of plural coordinators include a plurality of wireless high definition coordinators.

4. The station of claim 1 wherein the wireless network includes a wireless video area network (WVAN) or a wireless local area network (WLAN).

5. The station of claim 1 wherein the wireless network operates in a frequency band of 60 GHz.

6. The station of claim 1 wherein the wireless network includes beam-forming wireless networks.

7. The station of claim 6 further comprising:
   a storage configured to cache multiple beam vectors.

8. The station of claim 1 further comprising:
   an audio video processor coupled to the MAC;
   a physical device interface (PHY) coupled to the MAC, the PHY to encode and decode between a digital signal and a modulated analog signal, the PHY comprising a high rate physical layer circuit (HRP) and a low rate physical layer circuit (LRP); and
   a radio frequency (RF) transmitter coupled to the PHY to transmit data.

9. A method comprising:
   detecting a plurality of wireless networks with a station, each wireless network associated with a respective coordinator in a first set of plural coordinators;
   concurrently associating the station with each coordinator in the first set while the station is in a sleep mode operation with respect to each wireless network;
   coordinating synchronized sleep modes between the terminal and each of the first set of plural coordinators so that wake times of the station with respect to each of the coordinators do not completely overlap and each of the coordinators is operable to transmit a connection request to the station based on the wake times;

detecting that the station has been selected, as indicated by a connection request, connection indication or user input, for an active operation with respect to one of the coordinators in the first set;

upon detection that the station has been selected for the active operation, dissociating the station with all other coordinators in the first set and relinquishing the sleep mode operation with respect to the one of the coordinators in the first set to thereby perform the active operation, and upon completion of the active operation, re-associating the station with a second set of plural coordinators and operating the station in the sleep mode operation with respect to each wireless network formed by the second set of plural coordinators, wherein the first set of plural coordinators are available to the station before the active operation and the second set of plural coordinators are available to the station after the active operation at the time of re-association.

10. The method of claim 9 wherein the station includes a wireless high definition station, and each coordinator in the first set and the second set includes a wireless high definition coordinator.

11. The method of claim 9 wherein the wireless network includes a wireless video area network (WVAN) or a wireless local area network (WLAN).

12. The method of claim 9 wherein the wireless network operates in a frequency band of 60 GHz.

13. The method of claim 9 wherein the wireless network includes beam-forming wireless networks.

14. The method of claim 13 further comprising:
caching multiple beam vectors.

15. The method of claim 9 further comprising: arranging the sleep mode operation such that wake times of the station with respect to each of the coordinators do not overlap.

16. The method of claim 9 further comprising: renewing an association with each wireless coordinator in the first set within every association timeout period.

17. An article of manufacture comprising:
a non-transitory machine-accessible storage medium including data that, when accessed by a machine, cause the machine to perform a method comprising:

detecting a plurality of wireless networks, each wireless network associated with a respective coordinator in a first set of plural coordinators;

concurrently associating with each wireless network while the station is in a sleep mode operation with respect to each wireless network;

coordinating synchronized sleep modes between the terminal and each of the first set of plural coordinators so that wake times of the station with respect to each of the coordinators do not completely overlap and each of the coordinators is operable to transmit a connection request to the station based on the wake times;

detecting that the station has been selected, as indicated by a connection request, connection indication or user input, for an active operation with respect to one of the coordinators in the first set;

upon detection that the station has been selected for the active operation, dissociating the station with all other coordinators in the first set and relinquishing the sleep mode operation with respect to the one of the coordinators in the first set to thereby perform the active operation; and upon completion of the active operation, re-associating the station with a second set of plural coordinators and operating the station in the sleep mode operation with respect to each wireless network formed by the second set of plural coordinators, wherein the first set of plural coordinators are available to the station before the active operation and the second set of plural coordinators are available to the station after the active operation at the time of re-association.

18. The article of manufacture of claim 17 wherein the station includes a wireless high definition station, each coordinator includes a wireless high definition coordinator, the wireless network includes a wireless video area network (WVAN) or a wireless local area network (WLAN) operating in a frequency band of 60 GHz.

* * * * *